US011461387B2

(12) United States Patent
Woodall et al.

(10) Patent No.: US 11,461,387 B2
(45) Date of Patent: *Oct. 4, 2022

(54) AUDIBLE ACOUSTIC PERFORMANCE TOOL

(71) Applicant: COLUMBIA INSURANCE COMPANY, Omaha, NE (US)

(72) Inventors: Joseph M. Woodall, Ringgold, GA (US); Julie B. Brumbelow, Dalton, GA (US); Barrett R. Morton, Cartersville, GA (US); Alan Buttenhoff, Tunnel Hill, GA (US); Robert Blane Haywood, Chattanooga, TN (US); David Pearson, Easley, SC (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 416 days.

This patent is subject to a terminal disclaimer.

(21) Appl. No.: 16/599,974

(22) Filed: Oct. 11, 2019

(65) Prior Publication Data

US 2020/0042551 A1 Feb. 6, 2020

Related U.S. Application Data

(63) Continuation of application No. 16/122,537, filed on Sep. 5, 2018, now Pat. No. 10,482,123.

(60) Provisional application No. 62/554,468, filed on Sep. 5, 2017.

(51) Int. Cl.
| G06F 16/00 | (2019.01) |
| G06F 16/60 | (2019.01) |
| G06N 5/04 | (2006.01) |
| G06F 16/16 | (2019.01) |
| G06F 16/68 | (2019.01) |

(52) U.S. Cl.
CPC ............ *G06F 16/60* (2019.01); *G06F 16/164* (2019.01); *G06F 16/68* (2019.01); *G06N 5/04* (2013.01)

(58) Field of Classification Search
None
See application file for complete search history.

(56) References Cited

U.S. PATENT DOCUMENTS

| 6,212,838 B1 | 4/2001 | Eda |
| 7,194,094 B2 | 3/2007 | Horrall et al. |
| 7,918,313 B2 * | 4/2011 | Gross ................... G10K 11/162 |
| | | 181/294 |

(Continued)

FOREIGN PATENT DOCUMENTS

| WO | PCT/US2018/049573 | 9/2018 |
| WO | WO 2019/050965 | 3/2019 |
| WO | WO-2019/050965 A1 | 3/2019 |

OTHER PUBLICATIONS

European Search Report issued by the EP Patent Office dated Jun. 30, 2021 (Application No. 18853229.5) (Applicant—Shaw Ind. Grp., Inc.) (10 pages).

(Continued)

*Primary Examiner* — Debbie M Le
(74) *Attorney, Agent, or Firm* — Ballard Spahr LLP

(57) ABSTRACT

In an aspect, provided are methods, systems, and apparatuses comprising receiving a query specifying one or more materials of a floor/ceiling assembly and/or a classification or result, determining one or more media files responsive to the query, and providing the one or more media files for playback.

23 Claims, 8 Drawing Sheets

(56) References Cited

U.S. PATENT DOCUMENTS

| | | | |
|---|---|---|---|
| 8,590,670 | B1 | 11/2013 | Grube et al. |
| 8,640,824 | B2 | 2/2014 | Freedman et al. |
| 8,819,554 | B2 | 8/2014 | Basso et al. |
| 9,224,379 | B2 | 12/2015 | Takeda et al. |
| 9,715,367 | B2 | 7/2017 | Sheen |
| 9,728,180 | B2 * | 8/2017 | Robertson ............ G10K 15/08 |
| 9,803,358 | B2 | 10/2017 | Edmonds et al. |
| 9,952,825 | B2 | 4/2018 | Sheen |
| 9,971,726 | B2 | 5/2018 | Vajravel |
| 10,482,123 | B2 | 11/2019 | Woodall et al. |
| 2005/0216443 | A1 | 9/2005 | Morton et al. |
| 2010/0162117 | A1 | 6/2010 | Basso et al. |
| 2011/0173541 | A1 * | 7/2011 | Carlson ............ G06F 9/44505 |
| | | | 715/735 |
| 2012/0093320 | A1 | 4/2012 | Flaks et al. |
| 2013/0173034 | A1 | 7/2013 | Reimann |
| 2013/0179535 | A1 | 7/2013 | Baalu et al. |
| 2013/0226737 | A1 | 8/2013 | Milostic |
| 2015/0161695 | A1 | 6/2015 | Koby et al. |
| 2016/0150333 | A1 | 5/2016 | Goldstein et al. |
| 2018/0376268 | A1 | 12/2018 | Kerdranvat et al. |
| 2019/0073370 | A1 | 3/2019 | Woodall et al. |
| 2019/0318525 | A1 | 10/2019 | Schofield |

OTHER PUBLICATIONS

Notice of Allowance dated Aug. 26, 2020 for U.S. Appl. No. 16/447,387, filed Jun. 20, 2019 (8 pages).
Response to Non-Final Office Action filed on Aug. 11, 2020 for U.S. Appl. No. 16/447,387, filed Jun. 20, 2019 (12 pages).
Non-Final Office Action dated May 12, 2020 for U.S. Appl. No. 16/447,387, filed Jun. 20, 2019 (11 pages).
Armstrong, "Reverberation Time Calculation" [retrieved from: https:www.armstrongceilings.com/reverb/step.jsp] [Retrieved on: Oct. 9, 2018] (1 page).
InterfaceFlor, "Just the Facts" Acoustics Brochure 2011 [https:www.inierfaceflor.eu] (17 pages).
Lowe's FloorComfort LVT [Retrieved from: https://www.voutube.com/watch?y=DxNs377ymig] [Retrieved on: Oct. 9, 2018] (1 page).
International Search Report and Written Opinion dated Dec. 17, 2018 by the International Searching Authority for International Application No. PCT/US2018/049573, filed on Sep. 5, 2018 (Applicant—Shaw Industries Group, Inc.) (9 Pages).
Non Final Rejection dated Nov. 19, 2018 by the USPTO for U.S. Appl. No. 16/122,537, filed Sep. 5, 2018 and granted as U.S. Pat. No. 10,482,123 on Nov. 19, 2019 (Inventor—Joseph M. Woodall) (12 Pages).
Response to Non Final Rejection dated Feb. 12, 2019 to the USPTO for U.S. Appl. No. 16/122,537, filed Sep. 5, 2018 and granted as U.S. Pat. No. 10,482,123 on Nov. 19, 2019 (Inventor—Joseph M. Woodall) (13 Pages).
Final Rejection dated May 6, 2019 by the USPTO for U.S. Appl. No. 16/122,537, filed Sep. 5, 2018 and granted as U.S. Pat. No. 10,482,123 on Nov. 19, 2019 (Inventor—Joseph M. Woodall) (10 Pages).
Response to Final Rejection dated Jul. 8, 2019 to the USPTO for U.S. Appl. No. 16/122,537, filed Sep. 5, 2018 and granted as U.S. Pat. No. 10,482,123 on Nov. 19, 2019 (Inventor—Joseph M. Woodall) (13 Pages).
Advisory Action dated Aug. 7, 2019 by the USPTO for U.S. Appl. No. 16/122,537, filed Sep. 5, 2018 and granted as U.S. Pat. No. 10,482,123 on Nov. 19, 2019 (Inventor—Joseph M. Woodall) (3 Pages).
Response to Final Rejection dated Sep. 9, 2019 to the USPTO for U.S. Appl. No. 16/122,537, filed Sep. 5, 2018 and granted as U.S. Pat. No. 10,482,123 on Nov. 19, 2019 (Inventor—Joseph M. Woodall) (13 Pages).
Notice of Allowance dated Oct. 8, 2019 by the USPTO for U.S. Appl. No. 16/122,537, filed Sep. 5, 2018 and granted as U.S. Pat. No. 10,482,123 on Nov. 19, 2019 (Inventor—Joseph M. Woodall) (11 Pages).
Issue Notification dated Oct. 30, 2019 by the USPTO for U.S. Appl. No. 16/122,537, filed Sep. 5, 2018 and granted as U.S. Pat. No. 10,482,123 on Nov. 19, 2019 (Inventor—Joseph M. Woodall) (1 Page).
U.S. Appl. No. 62/554,468, filed Sep. 5, 2017, Joseph M. Woodall.
U.S. Appl. No. 16/122,537 (10,482,123), filed Sep. 5, 2018 (Nov. 19, 2019), Joseph M. Woodall.
Written Opinion issued by the IP Office of Singapore dated Oct. 14, 2021 for Application No. 11202001973Q (8 pages).
Search Report issued by the IP Office of Singapore dated Oct. 11, 2021 for Application No. 11202001973Q (4 pages).

* cited by examiner

AUDIBLE ACOUSTIC PERFORMANCE TOOL

CROSS REFERENCE TO RELATED APPLICATION

This application is a continuation of U.S. Non-Provisional application Ser. No. 16/122,537, filed on Sep. 5, 2018, which claims priority to U.S. Provisional Application No. 62/554,468, filed on Sep. 5, 2017, each of which are herein incorporated by reference in their entireties.

BACKGROUND

Noise is typically defined as unpleasant and unwanted sound. High noise levels worsen patient and staff outcomes in hospitals, hinder teaching and learning in schools, negatively impact productivity in offices, and disrupt living environments in homes, apartments, and condominiums. With flooring, one of the most abundant finishes in the built environment, the opportunity to positively influence the acoustical performance of a space is great. Different commercial floor coverings such as wood, ceramic, wood, resilient/vinyl, carpet and textile composite flooring control sound differently. Harder materials such as ceramic, wood, and resilient/vinyl absorb little or no sound and have greater potential to transmit sound, contributing to a noisier environment. Softer materials such as carpet and textile composite flooring absorb significantly more sound and transmit less sound, contributing to a quieter environment.

Tests exist that can measure the acoustic properties of interior surfaces and finishes. Such tests involve measuring the noise levels produced during the various test procedures, but the test results are typically reported only numerically as a classification or result. The classification or result is simply a number that means nothing beyond any scale that may apply to the classification or result. The classification or result does not communicate any information related to the way humans perceive sound. Consequently, it can be difficult to effectively communicate the test results to homeowners, developers, purchasers, contractors, manufacturers, and other stakeholders, and a primary goal of the tests—to assist in building design and construction—is therefore not met. These and other shortcomings are addressed by the present disclosure.

BRIEF SUMMARY

It is to be understood that both the following general description and the following detailed description are exemplary and explanatory only and are not restrictive.

In an aspect, disclosed are apparatuses, systems, and methods comprising receiving a query specifying one or more materials of a floor/ceiling assembly and/or a classification or result, determining one or more media files responsive to the query, and providing the one or more media files for playback.

In an aspect, disclosed are apparatuses, systems, and methods comprising receiving data comprising one or more testing parameters, one or more resulting measurements, and one or more classification/result, generating, based on the data, a predictive model, receiving a query comprising additional testing parameters, generating, based on applying the predictive model to the additional testing parameters, one or more predicted resulting measurements and one or more predicted classification/result, comparing the predicted resulting measurements to the data, identifying, based on the comparison, an existing test wherein the predicted test measurements are within a defined range of test measurements of the existing test, and providing one or more media files associated with the existing test for playback and an associated one or more predicted classification/result.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE SEVERAL VIEWS OF THE DRAWINGS

The accompanying drawings, which are incorporated in and constitute a part of this specification, illustrate embodiments and together with the description, serve to explain the principles of the methods and system.

DETAILED DESCRIPTION

Figure 1A:
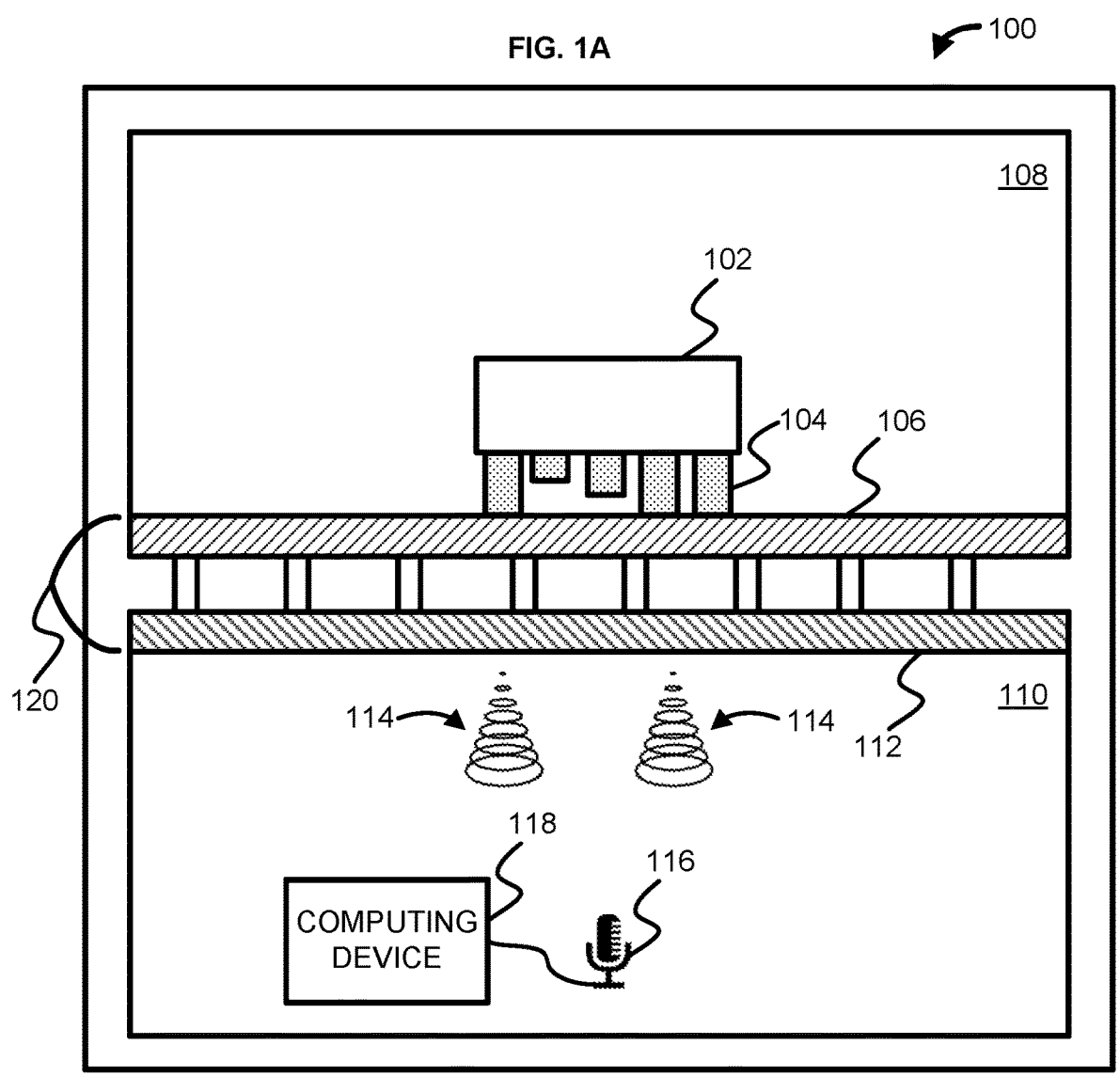
FIG. 1A illustrates an example system for generating media files.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As will be described in greater detail herein, systems and methods provided can provide a tool to compare acoustic performance of one or more products (e.g., flooring materials) using audio and/or video information that represents real-life performance. The audio and/or video information can represent a range of parameters allowing for comparison of varying flooring materials. This includes the ability to compare the audible difference of products and/or assemblies that have the same or similar numerical ratings.

The tool can ensure that a user is able to filter and compare results based on key product parameters (e.g., a type and/or material of flooring; an amount and/or type of padding; etc.) and building assembly parameters (e.g., construction material of a building; dimensions of a building/room; etc.). This allows the user to actually hear an accurate representation of the sound performance of multiple construction configurations during the design phase of a project.

In an aspect, the tool can comprise an interface (such as a web page) from which the user can select a floor assembly, a ceiling assembly, and/or a product configuration. Because a floor assembly, a ceiling assembly, and/or a product configuration with a given numerical classification or result may absorb and/or reflect sound differently based on product configuration, installation environment, and the like, the user selections result in a query to a media database where resulting audio file(s) can then be rendered for the user to hear the actual result for each combination, rather than merely relying on the given numerical classification or result. The disclosed tool enables comparison of acoustic performance of building materials in an easy to understand, intuitive format. For example, a user may select a floor assembly, a ceiling assembly, and/or a product configuration based on descriptive terms, rather than numerical ratings, of each (e.g., "hardwood flooring" with "2 inches of foam padding" in a "large room" with "gypsum board walls"). Acoustic performance of building materials can be compared by anyone who can operate and hear the tool, not just an acoustics specialist.

The typical frequency range for normal human hearing is 100-10,000 Hz. The human voice falls within the low-frequency end of the spectrum, at around 100-3,500 Hz. Building noises such as those emanating from elevators, HVAC systems and mechanical systems fall near the 1,000 Hz range. Loud noises such as alarms and bells are in the high-frequency end, up to 10,000 Hz. An airborne noise test relates to a surface's ability to absorb these and other airborne sounds which contribute to ambient (background) noise. The airborne noise test, ASTM C423-02a, measures a surface's ability to absorb these and other airborne sounds which contribute to ambient (background) noise. A floor covering sample is typically tested in a reverberation room. The test measures the product's absorption of sound at 15 different frequencies ranging from 100 Hz to 10,000 Hz. All of these frequencies fall within the range of what a normal human ear can hear. A floor covering's measure of effectiveness in absorbing airborne sound is expressed as a Noise Reduction Coefficient (NRC). The greater the absorption, the higher the NRC number. A surface that completely eliminates sound has an NRC of 1.0. Hard surfaces such as rubber and vinyl typically have NRCs of about 0.0-0.015, meaning they absorb little to no airborne sound. Commercial carpets used in hospitals, schools and offices have NRCs typically ranging between 0.15 and 0.2, meaning they absorb about 15-20 percent of airborne sound. A textile composite flooring's NRC is about 0.30, meaning 30 percent sound absorption.

A structure-borne noise test relates to a surface's ability to absorb impact noises, reducing surface noise generation and impact sound transmission into a space below. The structure-borne noise test most used for flooring, ASTM E492-09, studies a material's ability to reduce impact sound transmission into a space below. Footsteps and objects dropping on the floor are examples of impact noises. The structure-borne noise test is performed using a tapping machine in which five hammers strike the floor 10 times per second. Sound pressure in 16 frequency bands is measured in a reverberation room below the floor being tested. The measure is expressed as a whole number, Impact Insulation Class (IIC) (derived from ASTM E989, incorporated herein by reference). The higher the numerical rating, the greater the sound insulation. ASTM E989 is merely an example of a test that can be applied to the disclosed methods and systems. Other tests are contemplated, including, but not limited to, TIC and delta TIC (ASTM E492-09, ASTM E989-06, ASTM E2179-03, ISO 10140-3), STC (ASTM E90-09, ASTM E413-16, ISO 10140-2), and/or Noise Reduction/Absorption (ASTM C423-17, ISO 354, ISO 11654).

Figure 1B:
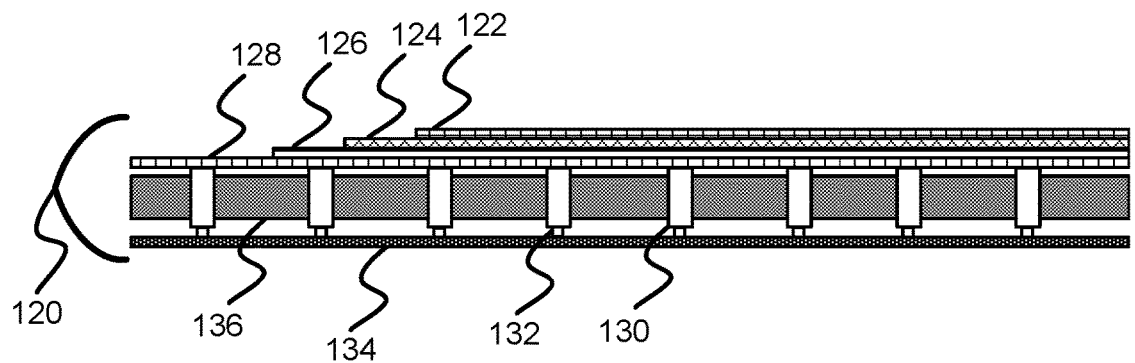
FIG. 1B illustrates an example floor/ceiling assembly.

FIG. 1A illustrates a system 100 configured for a structure-borne noise test. The structure-borne noise test can be performed using a tapping machine 102 in which one or more hammers 104 strike a floor 106 a predetermined number of times per second (e.g., 10 times per second). The tapping machine 102 is positioned on the floor 106 in a space 108. The space 108 can be a room of a building. The space 108 can be positioned to be above (e.g., on top of) another space 110. A floor/ceiling assembly 120 can separate the space 108 and the space 110. The floor/ceiling assembly 120 can comprise one or more materials that separate the space 108 and the space 110. The floor/ceiling assembly 120 can vary widely amongst structures. FIG. 1B provides an example floor/ceiling assembly 120. The floor/ceiling assembly 120 can comprise, for example, a floor covering 122, a padding 124, an underlayment 126, a subfloor 128, a structural member 130, a ceiling support 132, a ceiling 134, an insulation member 136, combinations thereof, and the like. The floor covering 122 can be, for example, a carpet covering, a resilient/vinyl covering, a hardwood covering, an engineered hardwood covering, a tile covering, and the like. The underlayment 126 can comprise, for example, rebond, frothed foam, waffle rubber, urethane foam, bonded urethane, flat rubber, fiber cushion, slab rubber, fiber, cork, and the like. The subfloor 128 can comprise, for example, hardboard, particle board, oriented strand board (OSB), plywood, concrete, and the like. The structural member 130 can comprise, for example, joists, trusses, a concrete slab, and the like. The ceiling support 132 can comprise furring channels. The ceiling 134 can comprise drywall, plaster, tile, and the like. The insulation member 136 can comprise, for example, fiberglass, mineral wool, plastic fibers, natural fibers, foam board, foam, cellulose, and the like. The floor/ceiling assembly 120 illustrated in FIG. 1B is merely an example floor/ceiling assembly 120. Many variations exist that vary not only the types of materials used but also which materials are used. For example, some floor/ceiling assemblies may lack a floor covering and/or a ceiling, or may lack an insulation member, and the like. In an aspect, a floor/ceiling assembly can comprise solely a structural member, such as a concrete slab.

Returning to FIG. 1A, the floor 106 can comprise any of the floor covering 122, the padding 124, the underlayment 126, the subfloor 128, the insulation member 136, the structural member 130, combinations thereof, and the like. As the hammers 104 of the tapping machine 102 strike the floor 106, sound travels through the floor 106 of the space 108 and a ceiling 112 of the space 110. The ceiling 112 can comprise the structural member 130, the ceiling support 132, the ceiling 134, the insulation member 136, combinations thereof, and the like. Sound pressure 114 in one or more frequency bands (e.g., 16) can be measured in the space 110 using a microphone 116 coupled to a computing device 118. A measurement can be expressed as a whole number numerical rating, Impact Insulation Class (IIC). The higher the IIC, the greater the sound insulation. ICC ratings vary, depending on materials and construction. For example, IICs for VCT typically range from 15 to 20, rubber IICs range from 15 to 30, carpet IICs range from 35 to 50, and the IIC for textile composite flooring is 64. The algorithm for converting sound pressure to a classification or result can be found in ASTM E492-09 & ASTM E989-06, incorporated herein by reference in its entirety.

The system 100 can be further configured to record video and/or audio. For example, the system 100 can record the sound pressure 114 that results from the hammers 104 of the tapping machine 102 striking the floor 106 causing sound to travel through the floor/ceiling assembly 120 and into the space 110. In an aspect, the floor/ceiling assembly 120 (including for example, the floor 106 and/or the ceiling 112) can be made of many different materials, or the same material. A plurality of combinations of materials for the floor/ceiling assembly 120 can be installed. For each of the plurality of combinations, the microphone 116 can record the resultant sound pressure 114. The computing device 118 can be configured to store the recording as a media file (either uncompressed or compressed (lossy or lossless)).

In various embodiments, the media file may include electronic representations of video, audio, text and/or graphics, which may include but is not limited to electronic representations of video, audio, or other multimedia, (e.g., video file) which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the media files described herein may include electronic representations of music, spoken words, or other audio, (e.g., sound file). The sound file can be, for example, in an uncompressed audio formats, such as WAV, AIFF, AU or raw header-less PCM. The sound file can be, for example, in a format with lossless compression, such as FLAC, Monkey's Audio (filename extension .ape), WavPack (filename extension .wv), TTA, ATRAC Advanced Lossless, ALAC (filename extension .m4a), MPEG-4 SLS, MPEG-4 ALS, MPEG-4 DST, Windows Media Audio Lossless (WMA Lossless), and Shorten (SHN). The sound file can be, for example, in a format with lossy compression, such as Opus, MP3, Vorbis, Musepack, AAC, ATRAC and Windows Media Audio Lossy (WMA lossy).

The computing device 118 can store (e.g., in a database) the media files along with the associated combination of flooring and/or ceiling materials used when generating a respective media file. The database of the computing device 118 can be transferred to another computing device (e.g., a server) for use with the disclosed tool.

Figure 2:
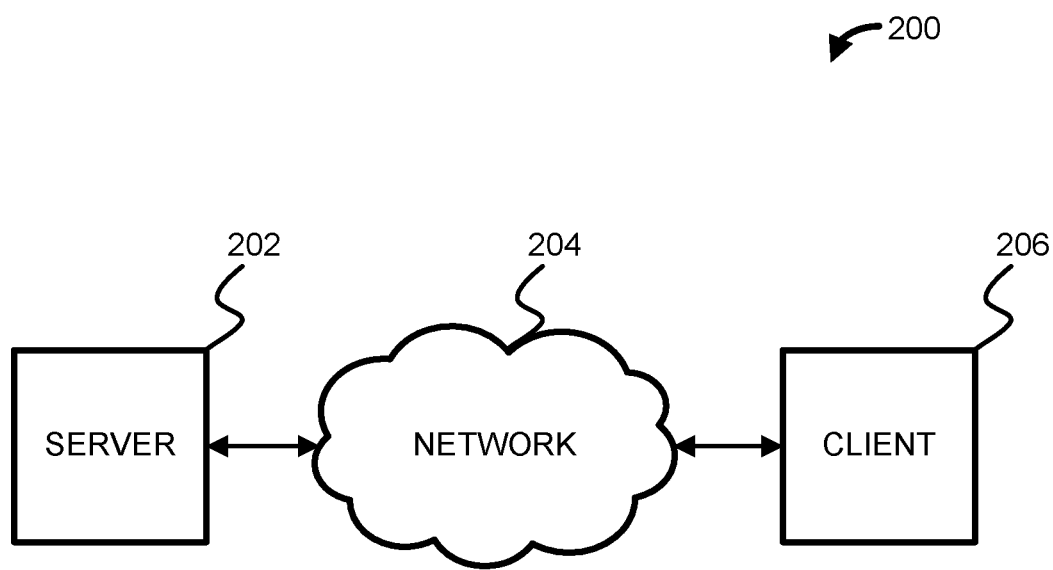
FIG. 2 illustrates an example operating environment.
Figure 3:
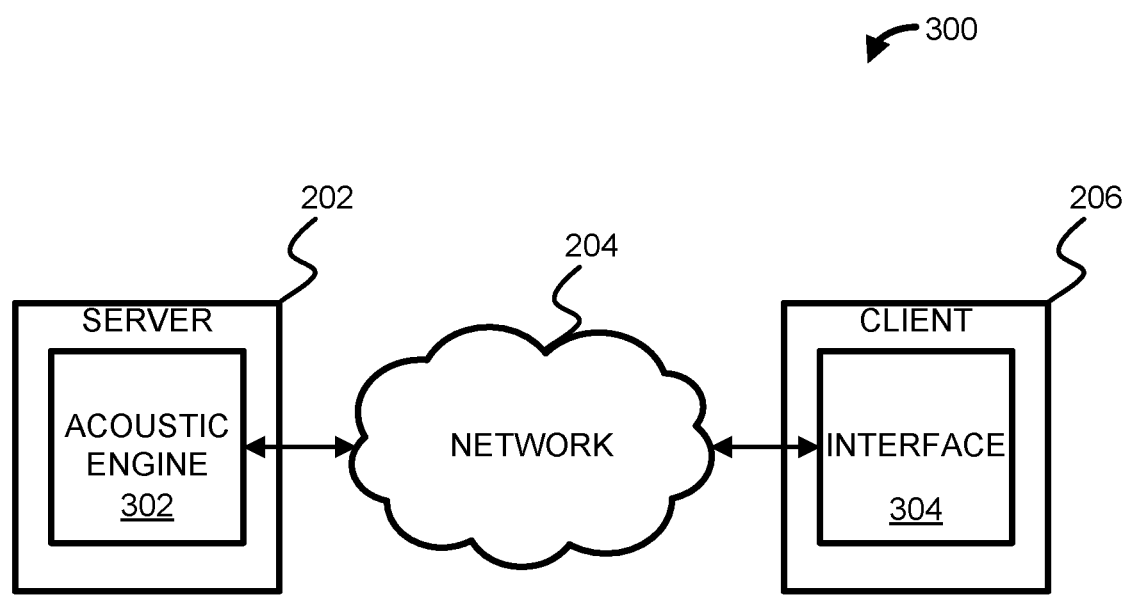
FIG. 3 illustrates an example operating environment.

FIG. 2 and FIG. 3 are block diagrams depicting non-limiting examples of a server 202 and a client 206 connected through a network 204 according to an aspect. The server 202 can comprise one or multiple computers configured to operate an acoustic engine 302. The client 206 can comprise one or multiple computers configured to operate an interface 304 such as, for example, a laptop computer, a smartphone, a desktop computer, and the like. Multiple clients 206 can connect to the server 202 through a network 204 such as, for example, the Internet. A user on a client 206 may connect to the acoustic engine 302 with the interface 304.

Figure 4:
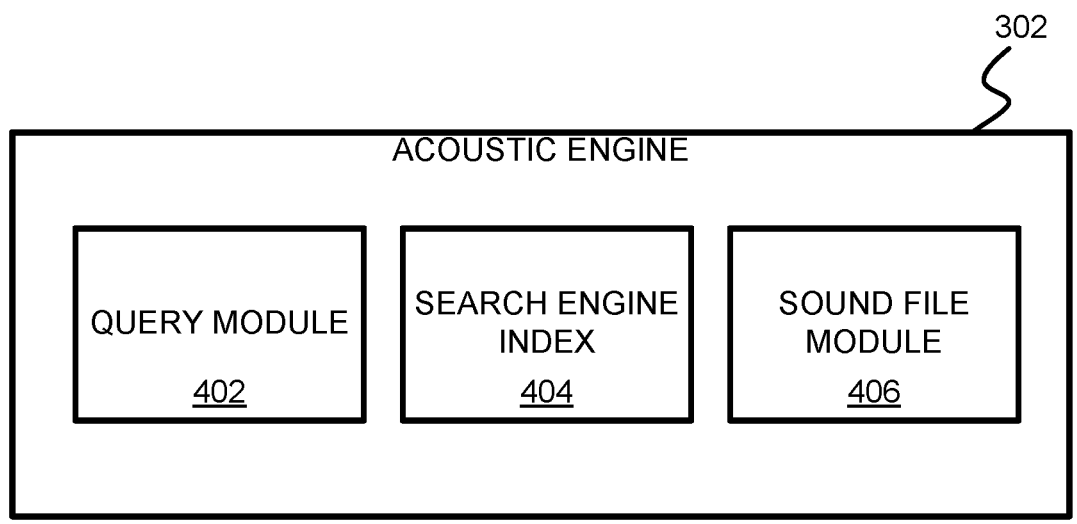
FIG. 4 illustrates an example acoustic engine.

The acoustic engine 302 can be configured to receive one or more queries related to a selection of one or more materials of a floor/ceiling assembly (for example, one or more of a flooring material or a ceiling material). The acoustic engine 302 can determine one or more media files associated with the query and make the one or more media files available for output by the client 206. FIG. 4 is a block diagram depicting an exemplary view of the acoustic engine 302 according to an aspect. The acoustic engine 302 can provide search results responsive to a user-defined search. The acoustic engine 302 can comprise one or more of, a query module 402, a search engine index 404, and a media file module 406. The search engine index 404 can analyze metadata associated with one or more media files to determine how to index the one or more media files. The metadata can comprise, for example, a type of material of a floor/ceiling assembly, a timestamp, a location, a building type, a classification or result (e.g., TIC classification), a decibel rating, a combination thereof, and the like. The metadata about the one or more media files can be stored in the search engine index 404 for use in queries by the query module 402.

The query module 402 can be configured to perform one or more types of searches. In an aspect, the query module 402 can be configured to perform a keyword search. A keyword search is a type of search that looks for matching electronic documents (one or more media files) that contain one or more words specified by a user. In an aspect, search statements provided to the query module 402 can be constrained to a finite listing of possible search terms. For example, the query module 402 can be constrained to only execute a search for materials found in the search engine index 404. In an aspect, the query module 402 can be configured to search based on a classification or result. For example, a user can specify a classification or result and one or more media files associated with materials of a floor/ceiling assembly that resulted in the classification or result (or a better classification or result) can be determined.

The search engine index 404 can be a database listing comprising, for example, electronic documents, electronic document metadata, and the like, referred to herein as search results. Searching the search engine index 404 can utilize the metadata. For example, searching the search engine index 404 by metadata can comprise performing a Boolean search. For example, metadata associated with a first media may indicate the first media file is indicative of sound for a first flooring type, a first building material, and a first room size. The user-defined search may indicate the first flooring type, the first building material, and a second room size. In this case, the first media file would not be part of the search results, since the room size associated with the first media file does not match the room size indicated by the user-defined search.

The media file module 406 can be configured to process one or more media files identified by the query module 402 as responsive to a search. In an aspect, the media file module 406 can cause the one or more media files to stream, download, or otherwise cause to be rendered by a client 206. The media file module 406 can be configured to transcode the one or more media files from one format to another, based on playback requirements imposed by the client 206. In yet another aspect, the media file module 406 can be configured to mix, overlay, normalize, or otherwise process the one or more media files. For example, the media file module 406 can be configured to adjust loudness of the one or more media files. In an aspect, the acoustic engine 302 can receive a volume setting for the client 206. Based on the volume setting, the media file module 406 can manipulate the one or more media files to ensure that the one or more media files, when rendered by the client 206, are played at an appropriate loudness to ensure that the audio playback is representative of the originally recorded sound. For example, a device playing the media file can play a calibrated sound. A microphone coupled or built in to the device can be used to receive the output and the software on the device can adjust an equalizer and/or volume to ensure the calibrated sound is played according to a known performance level.

In another aspect, upon executing a query and failing to identify a match based on the test data or the media files characteristics. These can be used to group products with similar design or sound performance at all frequencies. The disclosed methods and systems can then associate the group to the closest match to the query for playback. For example, if a floor covering 'A' was tested and had a recorded media file and floor covering 'A' used the same material and thickness as floor covering 'B' but had different dimensions and had similar results across all tested frequencies (e.g., 50 Hz to 10,000 Hz), the system can utilize the media file for product 'A' when product 'B' was in the executed query.

In an aspect, the disclosed methods and systems can perform sound performance audio mapping and prediction. A database can be created that comprises one or more (e.g., all) testing parameters, resulting measurements, summarized test results, and associated media file(s). Examples of testing parameters include, but are not limited to, test conducted, material(s) used in floor/ceiling assembly, combination(s) of materials used in floor/ceiling assembly Examples of resulting measurements include, but are not limited to, dB, absorption, and the like, across the tested frequencies (Hz). Examples of summarized test results include, but are not limited to, IIC, STC, and the like. One or more of each of the aforementioned testing parameters, each of the resulting measurements, and/or each of the summarized test results may be associated with a metadata for a given media file.

The database can be analyzed to create a prediction model that can predict the resulting measurements and summarized test result for a combination of test parameters that may not have been tested. The predictive model can be created using one or more algorithms (e.g., regression, k-nearest neighbors, random forest, decision tree learning, etc.). The predictive model can be updated as new test results are added to the database, either manually or automatically.

Accordingly, if a user selects a unique combination of test parameters where an actual test has not been conducted (and therefore no associated media file exists), the system can provide the query to the prediction model to predict the resulting measurements and summarized test results for the requested parameters and present them to the user. The predicted measurements can then be compared to the test measurements in the database of existing tests. If the predicted test measurements are within a defined range across all the test measurements of an existing test (for instance +/−3 dB for each frequency), the sound/media file of the matching test will be presented to the user as a representation of what the requested parameters should sound like in a real test.

Figure 5A:
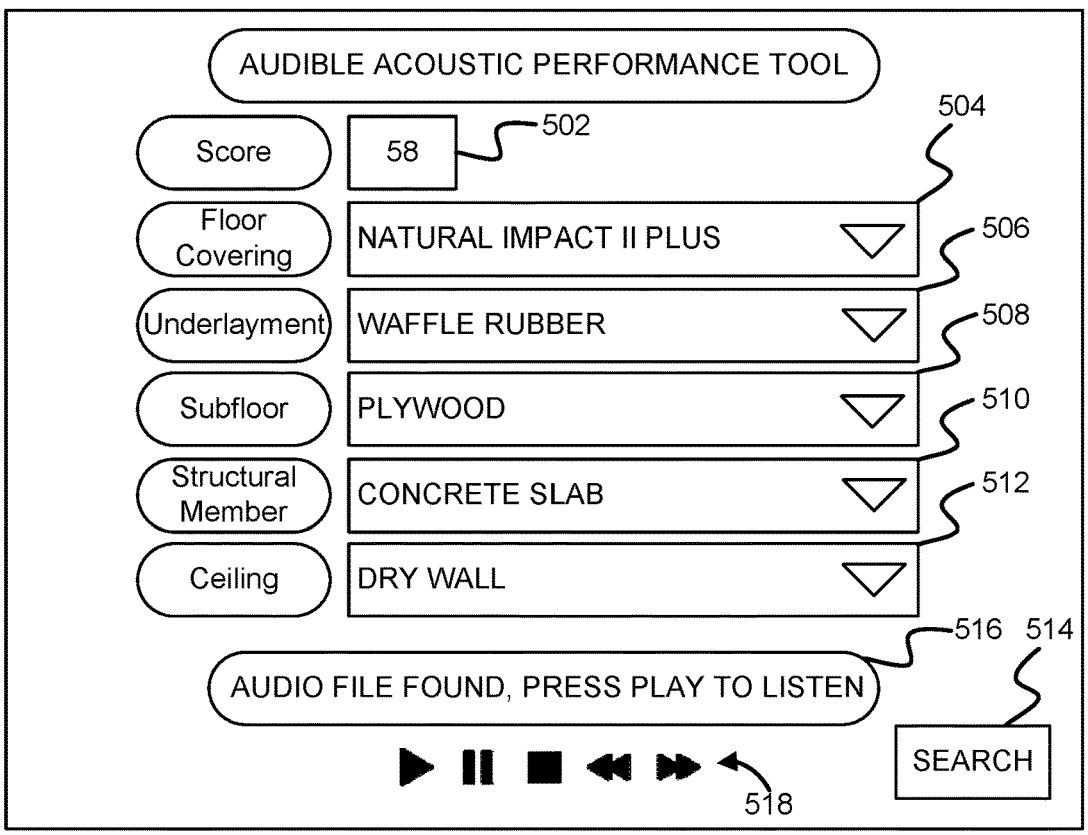
FIG. 5A illustrates an example interface.

FIG. 5A is a diagram depicting an example of a web browser screen 500 showing search results generated based on a user defined query. The web browser screen 500 can comprise one or more search boxes associated with one or more materials of a floor/ceiling assembly. For example, the web browser screen 500 can comprise a classification or result search box 502, a floor covering search box 504, an underlayment search box 506, a subfloor search box 508, a structural member search box 510, a ceiling search box 512, a search button 514, a result indicator 516, and media controls 518. Other search boxes are contemplated for any material and/or layer of a floor/ceiling assembly. A user inputs a search term in at least one of, the classification or result search box 502, the floor covering search box 504, the underlayment search box 506, the subfloor search box 508, the structural member search box 510, the ceiling search box 512, and initiates a search by clicking on the search button 514. In an aspect, the classification or result search box 502, the floor covering search box 504, the underlayment search box 506, the subfloor search box 508, the structural member search box 510, the ceiling search box 512 can comprise drop down selection boxes. The drop down selection boxes can be populated by the materials contained with the search engine index 404. The acoustic engine can provide a result of the search in the result indicator 516. If a result is found (e.g., a media file), the media controls 518 can be used to cause playback of the media file. In an aspect, the user can specify one or more inputs for a query into the classification or result search box 502, the floor covering search box 504, the underlayment search box 506, the subfloor search box 508, the structural member search box 510, the ceiling search box 512. For example, the user can specify a floor covering and a classification or result, but not other materials. The query engine 402 can then return a plurality of results made up of media files associated with the specified floor covering and classification or result, but varying in the other materials for the floor/ceiling assembly. In another example, the user can specify a ceiling and a classification or result, but not other materials. The query engine 402 can then return a plurality of results made up of media files associated with the specified ceiling and classification or result, but varying in the other materials for the floor/ceiling assembly. In another example, the user can specify the floor covering and the ceiling, but not the classification or result. The query engine 402 can then return a plurality of results made up of media files associated with the specified floor covering and the ceiling, but varying in the other materials for the floor/ceiling assembly, and display the associated classification or result in the classification or result search box 502.

Figure 5B:
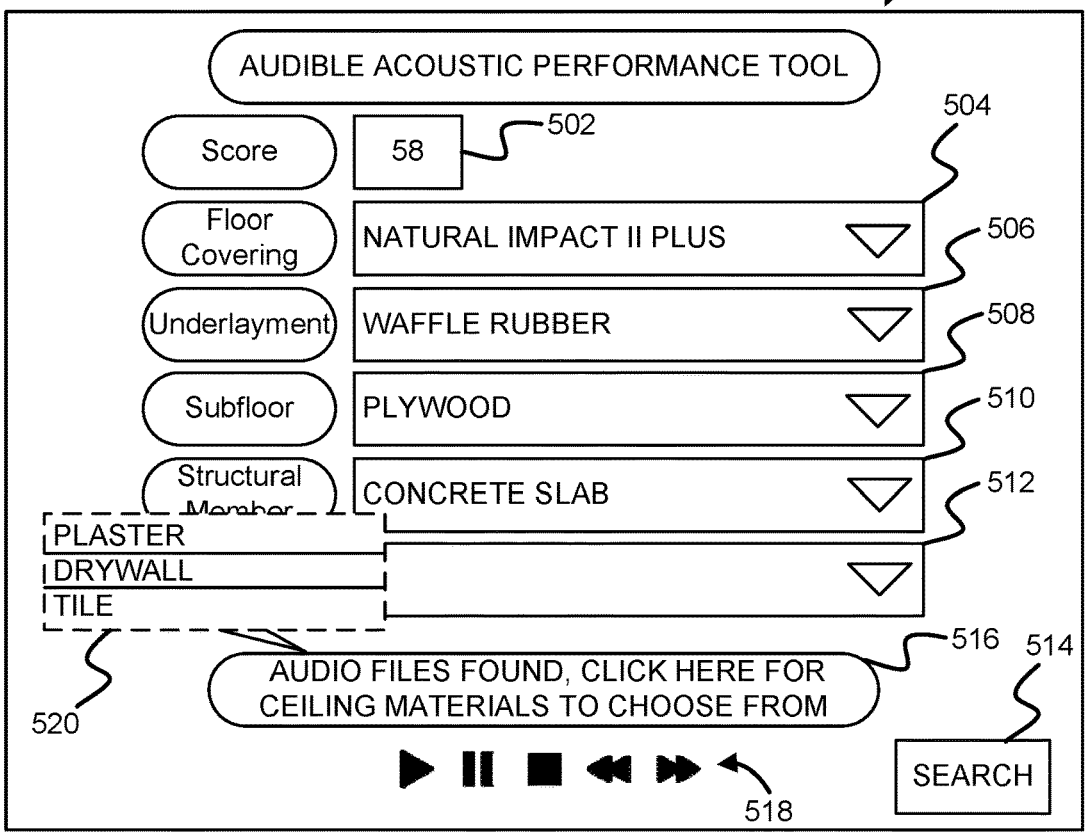
FIG. 5B illustrates an example interface.

FIG. 5B is a diagram depicting an example of a web browser screen 501 showing search results generated based on a user defined query. Web browser screen 501 illustrates a user defined query of a classification or result, a floor covering, an underlayment, a subfloor, and a structural member, but not a ceiling. The query engine 402 can then return a plurality of results made up of media files associated with the specified materials and classification or result, but varying in ceiling. The result indicator 516 can display a message indicating that a further selection is necessary in order to cause playback of one of the media files. The user can engage the result indicator 516 to display a list 520 of the various ceiling materials associated with the selected materials "NATURAL IMPACT II PLUS," "WAFFLE RUBBER," "PLYWOOD," "CONCRETE SLAB," and the classification or result of "58." Upon selecting a ceiling from the list 520, the user can engage the media controls 518 to cause playback of the associated media file.

Figure 6:
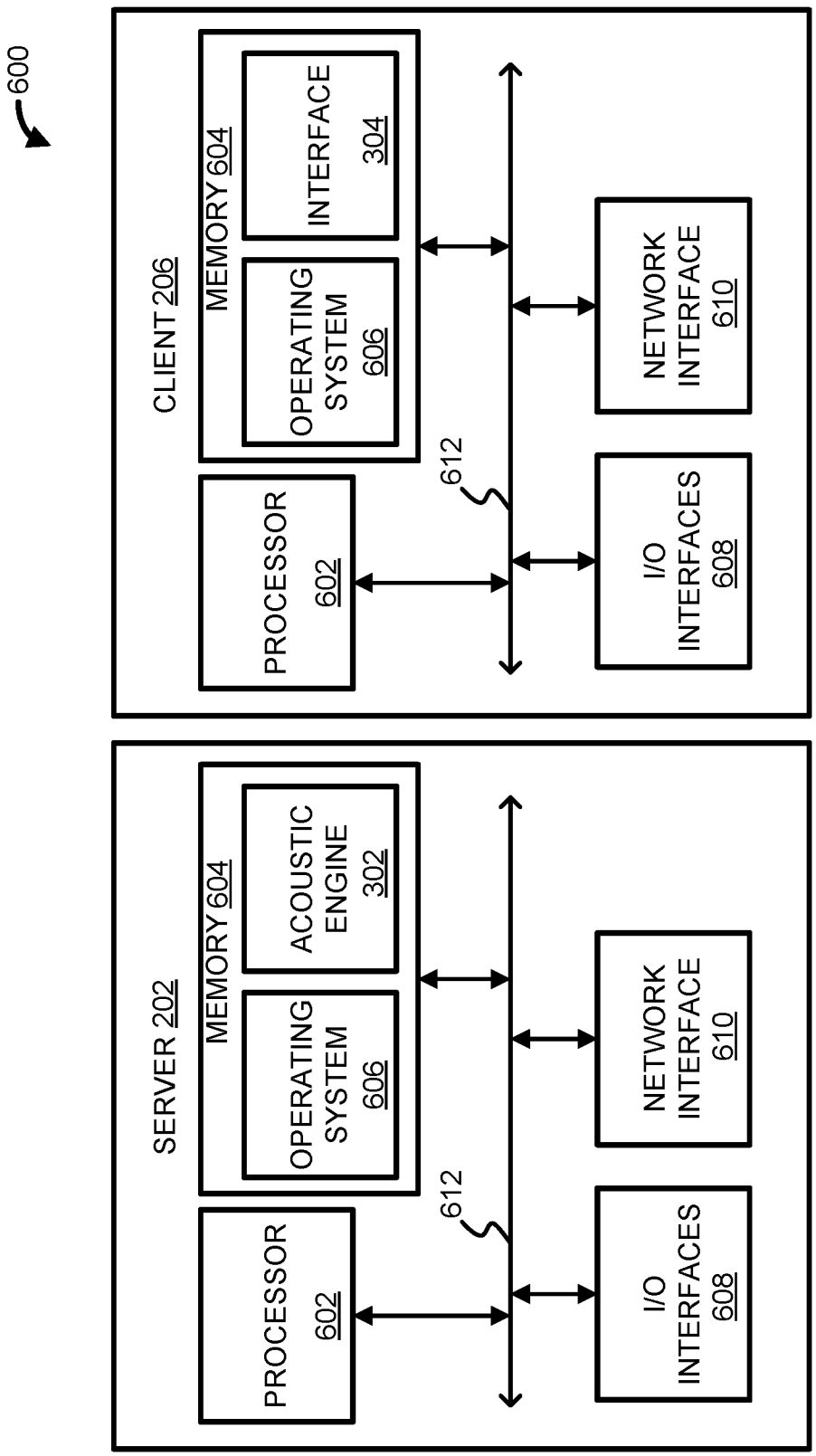
FIG. 6 illustrates an example operating environment.

FIG. 6 is a block diagram depicting an environment 600 comprising non-limiting examples of a server 202 and a client 206 according to an aspect. The server 202 and the client 206 can be a digital computer that, in terms of hardware architecture, generally includes a processor 602, memory system 604, input/output (I/O) interfaces 608, and network interfaces 610. These components (602, 604, 608, and 610) are communicatively coupled via a local interface 612. The local interface 612 can be, for example but not limited to, one or more buses or other wired or wireless connections, as is known in the art. The local interface 612 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 602 can be a hardware device for executing software, particularly that stored in memory system 604. The processor 602 can be any custom made or commercially available processor, a central processing unit (CPU), an auxiliary processor among several processors associated with the server 202 and the client 206, a semiconductor-based microprocessor (in the form of a microchip or chip set), or generally any device for executing software instructions. When the server 202 or the client 206 is in operation, the processor 602 can be configured to execute software stored within the memory system 604, to communicate data to and from the memory system 604, and to generally control operations of the server 202 and the client 206 pursuant to the software.

The I/O interfaces 608 can be used to receive user input from and/or for providing system output to one or more devices or components. User input can be provided via, for example, a keyboard and/or a mouse. System output can be provided via a display device and a printer (not shown). I/O interfaces 608 can include, for example, a serial port, a parallel port, a Small Computer System Interface (SCSI), an IR interface, an RF interface, and/or a universal serial bus (USB) interface.

The network interface 610 can be used to transmit and receive from an external server 202 or a client 206 on a network 204. The network interface 610 may include, for example, a 10 BaseT Ethernet Adaptor, a 100 BaseT Ethernet Adaptor, a LAN PHY Ethernet Adaptor, a Token Ring Adaptor, or any other suitable network interface device. The network interface 610 may include address, control, and/or data connections to enable appropriate communications on the network 204.

The memory system 604 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 604 may incorporate electronic, magnetic, optical, and/or other types of storage media. Note that the memory system 604 can have a distributed architecture, where various components are situated remote from one another, but can be accessed by the processor 602.

The software in memory system 604 may include one or more software programs, each of which comprises an ordered listing of executable instructions for implementing logical functions. In the example of FIG. 6, the software in the memory system 604 can comprise the acoustic engine 302 and a suitable operating system (O/S) 606. In the example of FIG. 6, the software in the memory system 604 comprises an interface 304 and a suitable operating system (O/S) 606. The Operating system 606 essentially controls the execution of other computer programs, such as the search engine 302, the interface 304, and provides scheduling, input-output control, file and data management, memory management, and communication control and related services.

The acoustic engine 302 can be used for providing search results responsive to a search provided by a user. In an aspect, the search term can be one or more keywords, one or more materials of a floor/ceiling assembly, a classification or result, combinations thereof, and the like. A search result can comprise one or more media files, or any other electronic file, each being associated with metadata indicative of a floor/ceiling assembly, a classification or result, combinations thereof, and the like, that were used during testing/recording. In an aspect, the one or more media files can reside on the server 202 and each of the one or more media files can comprise a location identifier, such as a URL (Uniform Resource Locator). In another aspect, the one or more media files can reside on multiple other servers while the server 202 maintains a record of the location identifier for each of the one or more media files. The acoustic engine 302 can be configured to search for the one or more media files. The acoustic engine 302 can use one or more algorithms to store and retrieve relevant search results in a database(s) responsive to the search term. For example, the database(s) may index the one or more media files according to metadata associated with the one or more media files. The acoustic engine 302 can comprise an updating algorithm to regularly search for new or updated media files. The acoustic engine 302 can be configured to operate on one or multiple server(s) 202.

An interface 304 can be used to view web pages on the client 206. The web pages may reside on a network 204 (e.g., Internet) or on a local computer. The interface 304 can be configured to view a web page responsive to an input from a user. The input can be a URL (Uniform Resource Locator) address input directly into the web browser or a hyperlink on a currently viewed web page. Examples of commonly used web browsers include Google Chrome, Microsoft Internet Explorer, Netscape Navigator, and Mozilla Firefox.

The acoustic engine 302 and/or the interface 304 can be a source program, an executable program (object code), a script, or any other entity comprising a set of instructions to be performed. When the acoustic engine 302 and/or the interface 304 is a source program, then the acoustic engine 302 and/or the interface 304 can be translated via a compiler, assembler, interpreter, or the like, which may or may not be included within the memory system 604, so as to operate properly in connection with the O/S 606. Furthermore, the acoustic engine 302 and/or the interface 304 can be written as (a) an object oriented programming language, which has classes of data and methods, or (b) a procedure programming language, which has routines, subroutines, and/or functions, such as, for example, but not limited to, C, C++, Pascal, Basic, Fortran, Cobol, Perl, and Java.

When the acoustic engine 302 and/or the interface 304 is implemented in software, it should be noted that the acoustic engine 302 and/or the interface 304 can be stored on any computer readable medium for use by or in connection with any computer related system or method. A computer readable medium can be a non-transitory electronic, magnetic, optical, or other physical device or means that can contain or store a computer program for use by or in connection with a computer related system or method. The acoustic engine 302 and/or the interface 304 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer-readable medium can be any non-transitory means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 7:
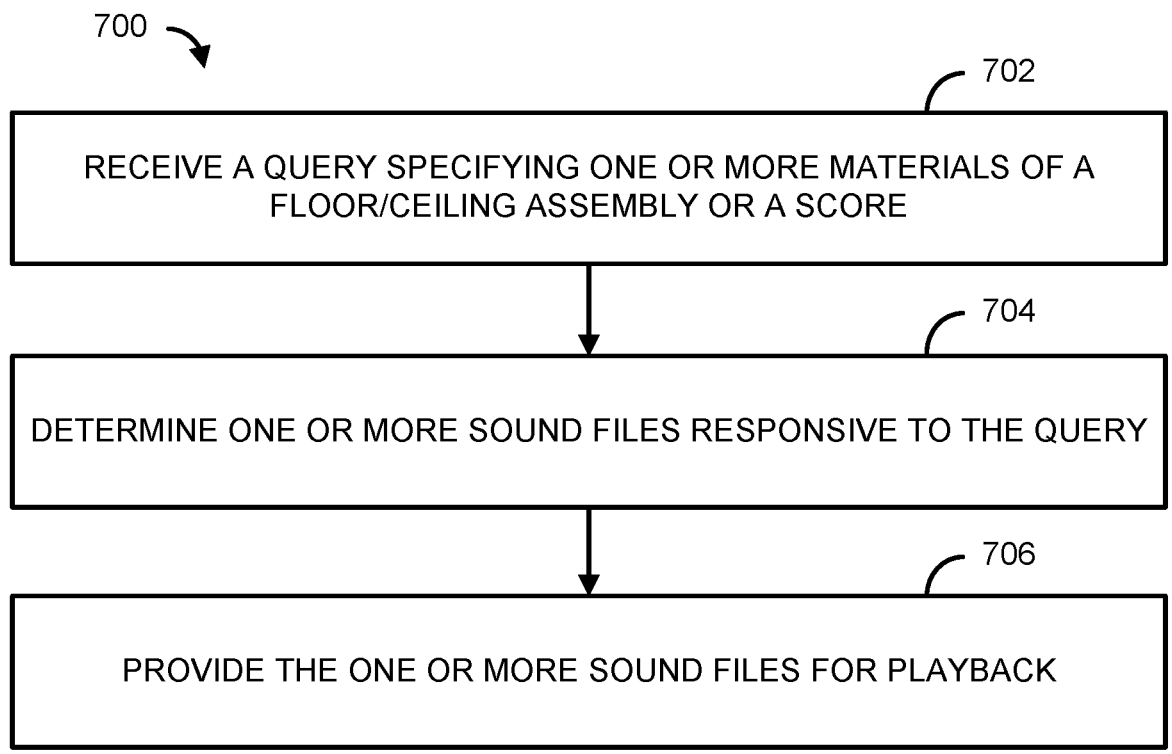
FIG. 7 illustrates a flowchart of an example method.

FIG. 7 is a flowchart depicting a general example of a method 700 for providing search results using an acoustic engine. A query is received specifying at least one of, one or more materials of a floor/ceiling assembly or a classification or result, as indicated in step 702. The classification or result can be related to an airborne noise test or a structure-borne noise test. For example, a web browser, or similar can be configured to view an acoustic engine web page, and a user may input a search term to the search engine via the web browser. One or more media files responsive to the query can be determined based on metadata associated with a plurality of media files, as indicated in step 704. For example, the acoustic engine may initiate a search of a database responsive to the search term. The one or more media files can be pre-generated by performing a structure-borne noise test (or any other related acoustic test). Receiving the query specifying one or more materials of a floor/ceiling assembly or a classification or result can comprise receiving the query specifying any combination of materials of a floor/ceiling assembly or a classification or result.

The one or more materials of the floor/ceiling assembly can comprise one or more of a floor covering, a padding, an underlayment, a subfloor, a structural member, a ceiling support, a ceiling, or an insulation member.

For example, the query can specify a floor covering and a ceiling. Determining the one or more media files responsive to the query can comprise determining a media file of the one or more media files associated with the floor covering and the ceiling. By way of further example, the query can specify a ceiling and a classification or result. Determining the one or more media files responsive to the query can comprise determining, based on metadata associated with the plurality of media files, one or more media files associated with the ceiling and the classification or result, wherein each of the one or more media files is associated with one or more combinations of floor covering, padding, underlayment, subfloor, structural member, ceiling support, or insulation member. In another example, the query can specify a floor covering and a classification or result. Determining the one or more media files responsive to the query can comprise determining, based on metadata associated with the plurality of media files, one or more media files associated with the floor covering and the classification or result, wherein each of the one or more media files is associated with one or more combinations of padding, underlayment, subfloor, structural member, ceiling support, ceiling, or insulation member. In another example, the query can specify a classification or result. Determining the one or more media files responsive to the query can comprise determining, based on metadata associated with the plurality of media files, one or more media files associated with the classification or result, wherein each of the one or more media files is associated with a different combination of floor covering, padding, underlayment, subfloor, structural member, ceiling support, ceiling, or insulation member.

For example, the query can specify a ceiling material and a flooring material and determining the one or more media files responsive to the query can comprise determining a media file of the one or more media files associated with the ceiling material and the flooring material. In another example, the query can specify a ceiling material and a classification or result and determining the one or more media files responsive to the query can comprise determining, based on metadata associated with the plurality of media files, one or more media files associated with the ceiling material and the classification or result, wherein each of the one or more media files is associated with a different flooring material. In another example, the query can specify a flooring material and a classification or result and determining the one or more media files responsive to the query can comprise determining, based on metadata associated with the plurality of media files, one or more media files associated with the flooring material and the classification or result, wherein each of the one or more media files is associated with a different ceiling material. In another example, the query can specify a classification or result and determining the one or more media files responsive to the query can comprise determining, based on metadata associated with the plurality of media files, one or more media files associated with the classification or result, wherein each of the one or more media files is associated with a different combination of a ceiling material and a flooring material.

The one or more media files can be provided for playback, as indicated in step 706. Providing the one or more media files for playback can comprise displaying an identifier of the one or more media files as an interface element, receiving an interaction with the interface element indicating a specific one of the one or more media files, and causing the specific one of the one or more media files to play on an audio playback device. The method 700 can further comprise determining a location identifier for each of the one or more media files and wherein providing the one or more media files for playback can comprise providing the location identifiers for each of the one or more media files. The method 700 can further comprise monitoring one or more network locations to determine one or more new media files and one or more updates to existing media files.

The method 700 can further comprise transcoding at least one of the one or more media files before providing the one or more media files for playback. In an aspect, the query can comprise a volume setting associated with an audio playback device. The method 700 can further comprise determining, based on a classification or result associated with each of the one or more media files, an optimal volume setting for the audio playback device to render each of the one or more media files and providing the optimal volume setting.

Figure 8:
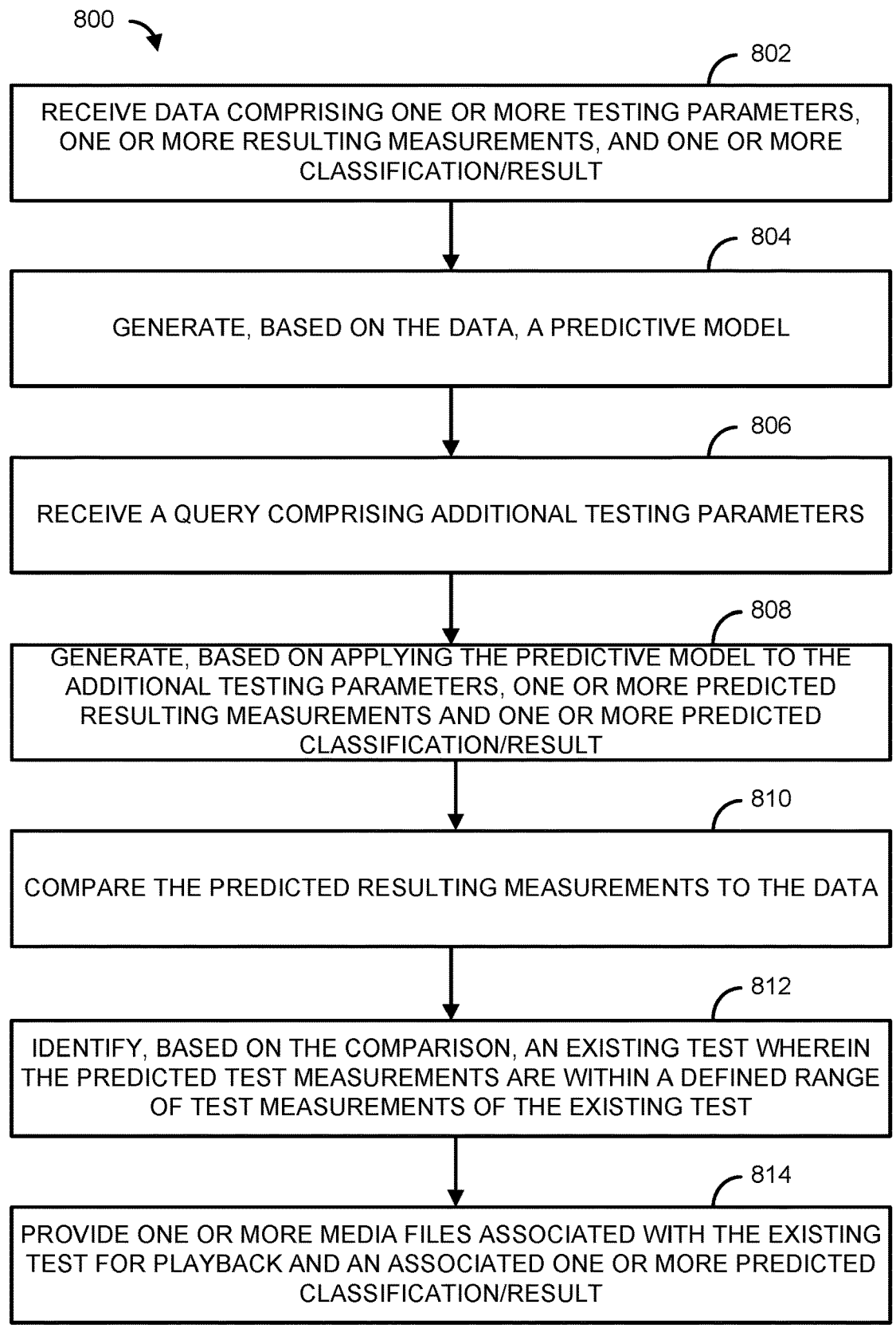
FIG. 8 illustrates a flowchart of another example method.

FIG. 8 is a flowchart depicting a general example of a method 800 for providing search results using an acoustic engine. The method 800 can comprise receiving data comprising one or more testing parameters, one or more resulting measurements, and one or more classification/result at 802. The one or more testing parameters comprise at least one of a material of a floor/ceiling assembly or a test conducted. The one or more resulting measurements comprise at least one of dB or absorption. The one or more classification/result comprises a sound performance testing result.

The method 800 can comprise generating, based on the data, a predictive model at 804. Generating the predictive model can comprise utilizing one or more of predictive analytics algorithms. The method 800 can comprise receiving a query comprising additional testing parameters at 806. The method 800 can comprise generating, based on applying the predictive model to the additional testing parameters, one or more predicted resulting measurements and one or more predicted classification/result at 808. The method 800 can comprise comparing the predicted resulting measurements to the data at 810. The method 800 can comprise identifying, based on the comparison, an existing test wherein the predicted test measurements are within a defined range of test measurements of the existing test at 812. The method 800 can comprise providing one or more media files associated with the existing test for playback and an associated one or more predicted classification/result at 814.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a computing device via a user interface, an indication of a user selection comprising one or more materials of a floor covering associated with a ceiling assembly;
determining, by the computing device based on metadata associated with a plurality of acoustic test recordings, one or more acoustic test recordings of the plurality of acoustic test recordings, wherein each acoustic test recording of the one or more acoustic test recordings is associated with:
the one or more materials of the floor covering,
the ceiling assembly, and
one or more other materials of a floor/ceiling assembly; and
providing, by the computing device via the user interface, at least one of the one or more acoustic test recordings for playback.

2. The method of claim 1, wherein the one or more other materials of the floor/ceiling assembly comprises one or more other floor coverings, a padding, an underlayment, a subfloor, a structural member, a ceiling support, a ceiling, or an insulation member.

3. The method of claim 2, wherein the underlayment comprises at least one of: rebond, frothed foam, waffle rubber, urethane foam, bonded urethane, flat rubber, fiber cushion, slab rubber, fiber, or cork.

4. The method of claim 1, wherein the one or more materials of the floor covering comprise at least one of: a carpet covering, a resilient/vinyl covering, a hardwood covering, an engineered hardwood covering, or a tile covering.

5. The method of claim 1, wherein the user interface comprises a website interface.

6. The method of claim 1, wherein the metadata associated with the plurality of acoustic test recordings comprises metadata indicative of one or more combinations of materials contained within the floor/ceiling assembly.

7. The method of claim 1, wherein the indication of the user selection specifies:
a classification or result; or
a classification range or a result range.

8. The method of claim 1, wherein the metadata associated with each of the one or more acoustic test recordings is associated with a different combination of materials contained within the floor/ceiling assembly.

9. The method of claim 1, wherein the one or more acoustic test recordings are pre-generated by performing a structure-borne noise test, and the method further comprises:
determining, based on a classification or result associated with each of the one or more acoustic test recordings, an optimal volume setting for an audio playback device to render each of the one or more acoustic test recordings; and
providing the optimal volume setting.

10. A method comprising:
receiving a query from a client computing device,
wherein the client computing device is configured to present a user interface that enables comparison of audio associated with two or more construction assemblies;
wherein the user interface comprises an option to select from a list of the two or more construction assemblies; and
wherein each construction assembly of the two or more construction assemblies comprises a floor covering, a padding, an underlayment, a subfloor, a structural member, a ceiling support, a ceiling, or an insulation member, and
wherein the query is representative of a selection of a construction assembly of the two or more construction assemblies made by a user;
determining, based on the selected construction assembly, one or more media files that are associated with and representative of a group of construction assemblies comprising one or more characteristics,
wherein the selected construction assembly comprises at least one characteristic that is similar to the one or more characteristics, and
wherein the one or more characteristics comprise a construction assembly design or a construction assembly sound performance;
and
transmitting the one or more media files to the client computing device for playback.

11. The method of claim 10, wherein a first construction assembly of the two or more construction assemblies comprises a concrete slab, and wherein a second construction assembly of the two or more construction assemblies comprises at least one of: a floor covering disposed on a subfloor lacking an insulation member, a floor covering comprising an underlayment disposed between the floor covering and the subfloor, the subfloor, a structural member, a ceiling support, a ceiling, an insulation member, or a padding.

12. The method of claim 11, wherein the floor covering comprises at least one of: a carpet covering, a resilient/vinyl covering, a hardwood covering, an engineered hardwood covering, or a tile covering, wherein the underlayment comprises at least one of: rebond, frothed foam, waffle rubber, urethane foam, bonded urethane, flat rubber, fiber cushion, slab rubber, fiber, or cork, wherein the subfloor comprises at least one of: hardboard, particle board, oriented strand board (OSB), plywood, or concrete, wherein the structural member comprises a concrete slab, and wherein the insulation member comprises at least one of: fiberglass, mineral wool, plastic fibers, natural fibers, foam board, foam, or cellulose.

13. The method of claim 10, further comprising: performing a plurality of audio tests associated with the two or more construction assemblies.

14. The method of claim 13, wherein the one or more media files are associated with the plurality of audio tests.

15. The method of claim 10, wherein the one or more characteristics further comprise:
a classification or result; or
a classification range or a result range.

16. The method of claim 10, wherein a first construction assembly of the two or more construction assemblies comprises a resilient/vinyl floor covering installed without an underlayment, and wherein a second construction assembly of the two or more construction assemblies comprises at least one of: the resilient/vinyl floor covering comprising an underlayment disposed between the floor covering and the subfloor.

17. A method comprising:
presenting a user interface that is configured to enable comparison of audio associated with two or more construction assemblies;
wherein the user interface comprises an option to select from a list of the two or more construction assemblies, and wherein each construction assembly of the two or more construction assemblies comprises a floor covering, a padding, an underlayment, a subfloor, a structural member, a ceiling support, a ceiling, or an insulation member;

receiving a query that is representative of a selection of a construction assembly of the two or more construction assemblies made by a user via the user interface;

determining, based on the selected construction assembly, one or more media files that are associated with and representative of a group of construction assemblies comprising one or more characteristics,
  wherein the selected construction assembly comprises at least one characteristic that is similar to the one or more characteristics,
  wherein the one or more characteristics comprise a construction assembly design or a construction assembly sound performance, and
  wherein the one or more media files comprise sound files of audio tests stored in a database; and causing playback of the one or more media files.

18. The method of claim 17, further comprising: performing the audio tests, wherein the audio tests are associated with the two or more construction assemblies.

19. The method of claim 17, wherein the one or more media files each comprise a recording of one of the audio tests.

20. A method comprising:
  storing audio files associated with an acoustic test performed on one or more floor assemblies, wherein each audio file comprises metadata associated with first characteristics of a respective floor assembly of the one or more floor assemblies;
  receiving a query that is representative of a selection of a floor assembly of the one or more floor assemblies,
  predicting, based on the selected floor assembly, second characteristics associated with the selected floor assembly;
  identifying one or more audio files associated with at least one floor assembly of the one or more floor assemblies,
    wherein the second characteristics associated with the selected floor assembly are within a defined range of the first characteristics associated with the identified at least one floor assembly, and
    wherein the first characteristics associated with the identified at least one floor assembly and the second characteristics associated with the selected floor assembly are each associated with the acoustic test and each comprise at least one of: a testing parameter, a resulting measurement, or a classification/result; and
  transmitting the one or more audio files for playback.

21. The method of claim 20, wherein the testing parameter comprises at least one of: a material of a floor covering or a material of a ceiling assembly.

22. The method of claim 20, wherein the resulting measurement comprises at least one: of a decibel (dB) level or an absorption level.

23. The method of claim 20, wherein the classification/result comprises a sound performance testing result.

* * * * *